US008379484B1

(12) United States Patent
Rikoski

(10) Patent No.: US 8,379,484 B1
(45) Date of Patent: Feb. 19, 2013

(54) APPARATUS AND METHOD FOR COMPENSATING IMAGES FOR DIFFERENCES IN ASPECT

(75) Inventor: Richard J. Rikoski, Alameda, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 487 days.

(21) Appl. No.: 12/802,453

(22) Filed: May 17, 2010

Related U.S. Application Data

(60) Provisional application No. 61/216,566, filed on May 18, 2009.

(51) Int. Cl.
*G01S 15/00* (2006.01)
(52) U.S. Cl. .......................................... 367/88
(58) Field of Classification Search .................. 367/88
See application file for complete search history.

(56) References Cited

U.S. PATENT DOCUMENTS

| 8,159,387 B1 * | 4/2012 | Fernandez et al. ............ 342/146 |
| 8,213,740 B1 * | 7/2012 | Rikoski ........................ 382/278 |

* cited by examiner

*Primary Examiner* — Daniel Pihulic
(74) *Attorney, Agent, or Firm* — James T. Shepherd

(57) ABSTRACT

A method and apparatus for eliminating aspect dependence of images generated by a radiative scanner such as a radar, sonar, or the like. Echoes from the scanner are received back and detected at a known and preselected number of aspects. The echo received at each aspect is multiplied by the transform of the point spread function of each of the other preselected aspects. In this manner, the frequency domain version of each echo is multiplied by the frequency domain point spread function of all of the preselected aspects, and the ultimate processed echo will be aspect independent.

4 Claims, 2 Drawing Sheets

APPARATUS AND METHOD FOR COMPENSATING IMAGES FOR DIFFERENCES IN ASPECT

CLAIM OF PRIORITY

This application has the priority of U.S. Provisional Patent Application Ser. No. 61/216,566, filed May 18, 2009, which is currently pending.

STATEMENT OF GOVERNMENT INTEREST

The invention described herein may be manufactured and used by or for the Government of the United States of America for governmental purposes without the payment of any royalties thereon or therefor.

FIELD OF THE INVENTION

The Invention pertains to radiative imaging, such as by radar or sonar, and feature based navigation.

BACKGROUND OF THE INVENTION

A fundamental problem in sonar or radar imaging is that the echoes returned from the same object will differ depending on the aspect at which the sonar or radar radiatively scans the object. This is of special concern to a class of problems collectively named feature based navigation, in which a vessel, such as an ocean going ship, submersible platform, helicopter or airplane, or the like, compares echoes it receives to a pre-existing radar/sonar map to identify or update the vessel's location. If the aspect at which the map was generated differs from the aspect at which the vessel's radar/sonar scans, and all things being equal this would be so almost always, the correlation between the vessel's scan and the pre-existing map will be degraded. Another way to put this is that the point spread function relating radiative scatter from a point, to a detector, varies with aspect, so that, for example, a sonar detector will have a different point spread function at each aspect at which it can scan. Thus even echoes from the same object taken at identical distances from the detector, but at different aspects with respect to the detector, will have different signatures, and their correlation with one another, or with the same object's echo signature in an extant map, will be degraded.

SUMMARY OF THE INVENTION

Accordingly, an object of the invention is to reduce or eliminate aspect dependence of radar/sonar echoes returned from the same object, or from highly similar objects.

Another object is to reduce or eliminate aspect dependence in feature based navigation.

In accordance with these and other objects made apparent hereinafter, the invention concerns a method and apparatus in which a radiative scanning signal, such as from a radiative scanner such as a sonar or radar, produces echoes of the signal, for example from an object one knows is in the vicinity. The echoes are received back and detected at a known and preselected number of aspects with respect to the radiative scanner. The echo received at each aspect is multiplied by the transform of the point spread function of each of the other preselected aspects. In this manner, the frequency domain version of each echo is multiplied by the frequency domain point spread function of all of the preselected aspects, and the ultimate processed echo will be aspect independent. Thus a vessel that processes its echoes in this manner can compare it to a pre-existing map generated in this manner to identify matches, thus determining the position of the vessel.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 1:
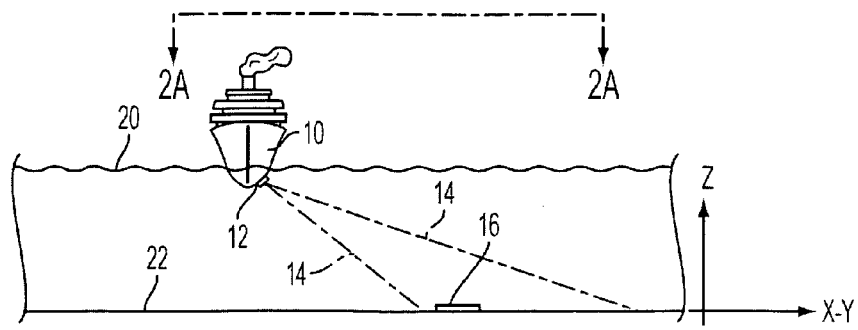
FIG. 1 is a plan view illustrating an embodiment of the invention and its operational environment.

With reference to the drawing figures, wherein like numbers indicate like parts throughout the several views, FIG. 1 shows a ship 10 on surface 20 with a side scanning sonar 12. FIG. 1 also shows a set of reference axes marked z, indicating altitude above marine bottom 22, and x-y, indicating the plane in which marine bottom 22 lies. Sonar 12 acoustically scans marine bottom 22 with a beamwidth illustrated in FIG. 1 as having azimuthal (z axis) boundary 14. Within beamwidth 14 on marine bottom 22 is bottom patch 16 which is distinct from the surrounding portion of bottom 22. Patch 16 could be, for example, areas of sea shells or pebbles, surrounded by an otherwise sandy bottom 22.

Figure 2A:
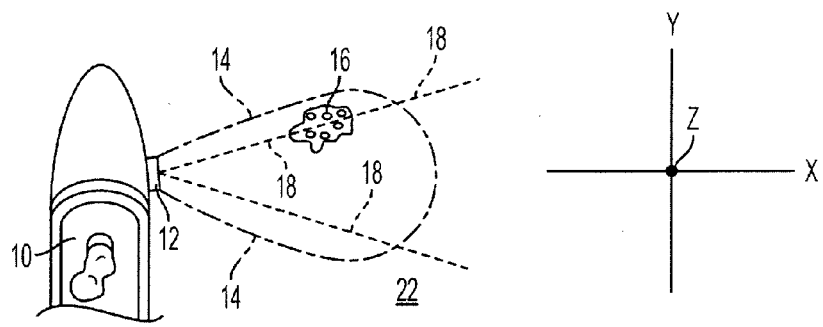
FIG. 2a is a view in the direction of lines 2a-2a of FIG. 1.
Figure 2B:
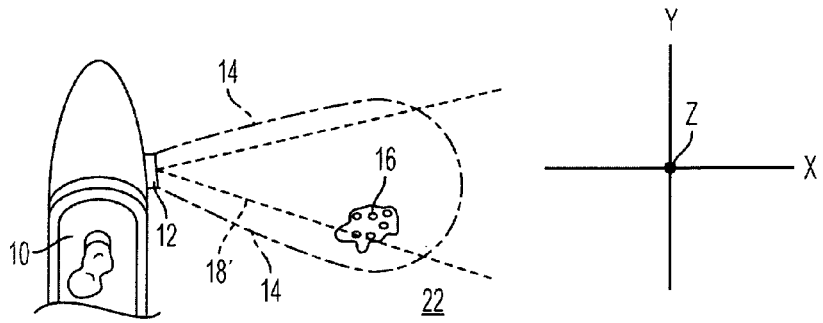
FIG. 2b is a view like that of FIG. 2a, which illustrates the problem of aspect dependence on imaging.

FIGS. 2a and 2b show the same scene as FIG. 1, but looking down in the direction of marine bottom 22, and with the difference between 2a and 2b being that ship 10 is at a different position with respect to bottom patch 16. In each of these drawing figures, patch 16 is located within beamwidth 14, but with aspect 18 in FIG. 2a, and aspect 18' in FIG. 2b.

The effect of varying aspect is seen from the following: For a sonar on ship 10 centered at (x,y), the image $I_1(x,y)$ of a point at $(x_1, y_1)$ is:

$$I_1(x,y) = p_1(x-x_1, y-y_1)$$

Where $P_1$ is the point spread function of $I_1$ for sonar 12. A scene at some distance $(x_1, y_1)$ from sonar 12 can be represented as a collection of sonar point scatterers, which are representable as the sum of impulse functions:

$$f(x, y) = \sum_{i=1}^{N} \delta(x - x_1, y - y_1)$$

The image $I_1$ of scene f, as viewed at sonar 12, is the convolution of scene f(x,y) with a time reversed version of the point spread function, which in the frequency domain is:

$$I_1(k_x, k_y) = F(k_x, k_y) P_1^*(k_x, k_y)$$

where $k_x$ and $k_y$ are spatial wavenumbers in the x and y directions, $I_1(k_x, k_y)$ are the two dimensional spatial Fourier transforms of $I_1(x,y)$ and f(x,y) respectively, and $P_1^*(k_x, k_y)$ is the complex conjugate of the two dimensional Fourier Transform of $p_1$ (x,y). A second image $I_2$ at a second vantage point $(x_2, y_2)$ would similarly have a frequency domain representation:

$$I_2(k_x,k_y)=F(k_x,k_y)P_2{}^*(k_x,k_y)$$

To recover the images, one must deconvolve them. In principle, one could simply divide $I_1$ or $I_2$ by its corresponding point spread function, and, if desired, transform back to the real domain (x and Y). This, however, is computationally problematic, and may on occasions involve division by zero. If, however, one is concerned with only a finite number of vantage points (here, as an example, two: 18 and 18'), and one can convolve (or multiply in the frequency domain) an image viewed at one aspect by the point spread functions associated with each of the other aspects of interest, then, in this example, one gets:

$$I_2(k_x,k_y)P_1{}^*(k_x,k_y)=I_1(k_x,k_y)P_2{}^*(k_x,k_y)=F(k_x,k_y)P_1{}^*(k_x,k_y)P_2{}^*(k_x,k_y)$$

and thus the signature of an image of an object as detected is the same, regardless of the vantage point, i.e. aspect at which one images the object.

Figure 3:
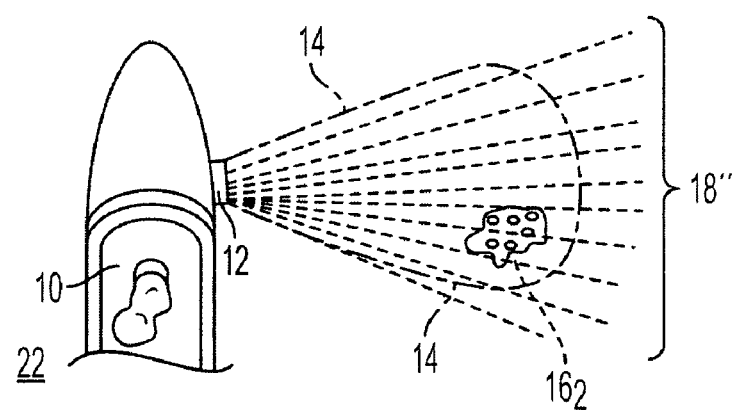
FIG. 3 is a view similar to that of FIGS. 2a and 2b, illustrating operation of an embodiment of the invention.

The value of this is further illustrated in FIG. 3, in which side scanning sonar 12 on ship 10 is illustrated collectively as having plural aspects 18" of interest, which are relatively finely spaced apart, each aspect having its own point spread function with respect to sonar 12. Sonar 12 is directional, e.g. a linear phased array, and thus one knows a priori the direction corresponding to each one of the aspects 18". As sonar 12 scans, a processor aboard ship 10 associated with sonar 12 records the echo signatures, determines from which direction relative to sonar 12 the echoes arrived, and thus identifies which point spread function that corresponds to which echo. The processor is preferably an onboard process computer, but could be, e.g., a distant computer to which sonar 12 is telimetered. The processor transforms the echoes into the frequency domain, by performing a Fourier Transform on each, preferably by a Fast Fourier Transform, and multiplies each echo by the Fourier Transform of each of the other aspects 18" of interest. If the processor aboard ship 10 has a pre-existing map of marine bottom 22 generated earlier by a survey in which a like sonar produced echo data recorded at the same aspects 18", with the echoes at each aspect multiplied by the frequency domain point spread functions at each of the other aspects, then an echo returned from the same object will have the same signature, regardless of aspect. If, for example, one wishes to establish ship 10's position, sonar 12 scans, and compares, preferably by correlation, its echoes to echoes in the above described pre-existing sonar map to establish as a match. Because the echoes in the map, and those generated by sonar 10 are aspect independent, an echo from patch 16 in the map will correlate strongly with an echo from patch 16 detected at sonar 12 whether or not sonar 12 and the survey that generated the map scanned patch 16 from the same aspect. A strong correlation indicates a match, identifying ship 10's location with respect to patch 16, which, presumably, would be a feature of known position, thus identifying ship 10's location absolutely.

Instead of transforming echoes and point spread functions to and from the frequency domain and multiplying as above described, one could instead convolve the signals' echoes and point spread functions with one another, although this is much more computationally involved and correspondingly less efficient.

In practice, a large range of sensors could advantageously use the foregoing scheme, for example nearfield real aperture sonars or radars, synthetic aperture sonars or radars, or coherent near aperture sensors using other modalities.

Likewise, a large range of vehicles could advantageously use the foregoing scheme, for example autonomous underwater vehicles (AUVs), or submarines or other submersibles. So too could unmanned aerial vehicles (UAVs), or airplanes, helicopters, or spacecraft with radars like that currently on the Space Shuttle or satellites.

The invention has been described in what is considered to be the most practical and preferred embodiments. It is recognized, however, that obvious modifications to the embodiments may occur to those with skill in this art. Accordingly, the scope of the invention is to be discerned from reference to the appended claims, wherein:

I claim:

1. A radiative scanner, comprising:

a transmitter adapted to generate a signal; and a receiver adapted to receive echoes of said signal at any of a preselected plurality of aspects, said receiver having a respective point spread function associated with each of said plurality of aspects;

wherein said receiver comprises a processor adapted to form, for each of said plurality of aspects, the product of the Fourier transform of echoes received at said each of said plurality of aspects with the Fourier transform of said point spread functions associated with each of the other of said preselected plurality of aspects.

2. A radiative scanner, comprising:

a transmitter adapted to generate a signal; and a receiver adapted to receive echoes of said signal at any of a preselected plurality of aspects, said receiver having a respective point spread function associated with each of said plurality of aspects;

wherein said receiver comprises a processor adapted to form, for each of said plurality of aspects, the product of the convolution of echoes received at said each of said plurality of aspects with the point spread functions associated with each of the other of said preselected plurality of aspects.

3. A method, comprising:

generating a signal;

using a receiver to receive echoes of said signal at any of a preselected plurality of aspects, said receiver having a respective point spread function associated with each of said plurality of aspects; and forming, for each of said plurality of aspects, the product of the Fourier transform of echoes received at said each of said plurality of aspects with the Fourier transform of said point spread functions associated with each of the other of said preselected plurality of aspects.

4. A method, comprising:

transmitting a signal;

using a receiver to receive echoes of said signal at any of a preselected plurality of aspects, said receiver having a respective point spread function associated with each of said plurality of aspects; and processing, for each of said plurality of aspects, the product of the convolution of echoes received at said each of said plurality of aspects with the point spread functions associated with each of the other of said preselected plurality of aspects.

* * * * *